United States Patent
Lim et al.

(10) Patent No.: US 6,844,095 B2
(45) Date of Patent: Jan. 18, 2005

(54) HUMIDIFIER FOR HUMIDIFYING REACTANT GASES FOR A POLYMER ELECTROLYTE FUEL CELL SYSTEM

(75) Inventors: Tae-Won Lim, Seoul (KR); Ki-Chun Lee, Kyoungki-do (KR); In-Hwan Oii, Seoul (KR); Seock-Jac Shin, Seoul (KR); Se-Kyu Park, Seoul (KR); Hung-Young Ila, Seoul (KR); Seong-Ahn Hong, Seoul (KR)

(73) Assignees: Hyundai Motor Company, Seoul (KR); Korea Institute of Science and Technology, Seoul (KR)

( * ) Notice: Subject to any disclaimer, the term of this patent is extended or adjusted under 35 U.S.C. 154(b) by 353 days.

(21) Appl. No.: 10/028,663

(22) Filed: Dec. 28, 2001

(65) Prior Publication Data

US 2002/0106545 A1 Aug. 8, 2002

(30) Foreign Application Priority Data

Dec. 29, 2000 (KR) ......................................... 2000-85240

(51) Int. Cl.$^7$ ............................. H01M 8/04; H01M 2/02
(52) U.S. Cl. ............................. 429/26; 429/24; 429/25; 429/34
(58) Field of Search ............................. 429/24, 25, 26, 429/34

(56) References Cited

U.S. PATENT DOCUMENTS 5,792,390 A * 8/1998 Marino ...................... 261/72.1
6,699,608 B2 * 3/2004 Blaszczyk et al. ............ 429/13

* cited by examiner

Primary Examiner—Patrick Ryan
Assistant Examiner—Thomas H. Parsons
(74) Attorney, Agent, or Firm—Antonelli, Terry, Stout & Kraus, L.L.P.

(57) ABSTRACT

The present invention relates to a humidifier for humidifying reactant gases for a polymer electrolyte fuel cell system, and more particularly, to the humidifier for humidifying reactant gas which adjusts an amount of water for humidification while reducing electric power consumption and size, thereby maintaining an optimal temperature and humidity of the reactant gas supplied to a polymer electrolyte fuel cell. The humidifier for humidifying reactant gases comprises a humidification vessel connected to a reactant gas inlet pipe for supplying reactant gases thereto, a water inlet pipe for supplying water thereto, and a reactant gas supplying pipe for supplying the humidified reactant gas to the fuel cell are connected, respectively, and a sprayer which is installed in the humidification vessel and finely sprays the reactant gases and water which are supplied to the humidification vessel.

5 Claims, 2 Drawing Sheets

HUMIDIFIER FOR HUMIDIFYING REACTANT GASES FOR A POLYMER ELECTROLYTE FUEL CELL SYSTEM

BACKGROUND OF THE INVENTION

1. Field of the Invention

The present invention relates to a humidifier for humidifying reactant gases for a polymer electrolyte fuel cell system, and more particularly, to a humidifier for humidifying reactant gases which is needed for the development and actual operation of a polymer electrolyte fuel cell system and is capable of adjusting an amount of water while reducing electrical power consumption and its size, thereby maintaining an optimal temperature and humidity of the reactant gases supplied to a polymer electrolyte fuel cell.

2. Description of the Prior Art

In general, a fuel cell system, which is widely known as an electrical power generation system, generates electrical power by electrochemical reactions. Such fuel cell systems have very extensive ranges of applications from small to large-sized systems for reasons that they work with higher energy efficiency and also produce no pollutants in contrast to the conventional combustion engines. The fuel cell systems are classified according to the kind of an electrolyte that is used namely, alkaline type, phosphoric acid type, molten carbonate type, solid oxide type, polymer electrolyte type, etc.

Among the above-mentioned various types of fuel cells, the polymer electrolyte fuel cell system is particularly suitable for an automobile or a mobile electric power source because it has advantages in that it is operable even at a relatively low temperature, its electrolyte is solid so that there is no danger of leakage of the electrolyte, and its maintenance and repair are convenient.

In a polymer electrolyte fuel cell system, the polymer membrane, used as a polymer electrolyte, through which the protons ($H^+$) move, must be in a sufficiently moistened condition to provide an adequate ionic conductivity. In the case when the electrolyte membrane is dehydrated, the fuel cell system is not normally operable due to the degradation of its ionic conductivity. For this reason, the humidifying process is an indispensable part of the fuel cell system which prevents the electrolyte from drying.

The characteristics of the polymer electrolyte fuel cell system are greatly influenced by manufacturing and operating techniques. Accordingly, the operating parameters such as temperature of a fuel cell, flow rate, pressure, and temperature of reactant gases, and humidity should be adjusted to be in an optimal condition by means of a humidification apparatus.

As illustrated in FIG. 1, the gas supply apparatus comprises: an inlet pipe 1 through which the reactant gases are supplied from a reactant gas reservoir; a flux regulator 2 for adjusting the flow rate of supplied reactant gases; a humidifier 3 for humidifying the reactant gases; a gas supply pipe 4 for supplying the humidified reactant gases to the fuel cell 5; a pressure regulator 7 for adjusting the pressure of reactant gases inside the fuel cell 5; an outlet pipe 6 through which the reactant gases are emitted from the fuel cell 5 by the operation of the pressure regulator 7; a fuel cell thermocouple 8 which is installed inside the fuel cell 5 and is used in a temperature monitor 10 for controlling a coolant regulator 9; and a coolant regulator 9 for cooling the fuel cell 5.

The conventional humidifier that is commonly positioned between the gas supply apparatus and the fuel cell 5, is shown in FIG. 2. The humidifier, which humidifies reactant gases by passing through heated water comprises: a humidifier thermocouple 13 installed in the middle of a humidification vessel 17; a heater 14 disposed along the circumferential surface of the humidification vessel 17; insulating material 15 surrounding the outer surface of the heater 14; a water level gauge 16, which is installed at one side of the humidification vessel 17 and which indicates the water level of the humidification vessel 17; a gas supplying pipe 4 through which the humidified reactant gases are supplied to the fuel cell 5; and an inlet pipe 12 through which the reactant gases is supplied to the humidifier.

However, the above-described conventional humidifier is defective in that it is difficult to adjust the size of bubbles generated inside the humidifier and the amount of water needed for humidification, heating water consumes excessive electrical power, and moreover, the overall size of the humidifier increases according to an increase in the capacity of a fuel cell system.

In consideration of a mobile power supply requiring a restricted size and electrical power consumption by supplemental devices being minimized, the conventional humidifier has several limitations to being used in actual applications, since additional electrical power for heating water and an increase in overall size is required.

In another conventional method of humidifying reactant gases using a membrane, there is a drawback in that additional humidification devices should be mounted inside a fuel cell. As a result, the inner construction of a fuel cell is not only complicated but the size of a fuel cell is increased. Moreover, such apparatus has another drawback that the humidification conditions are varied with the state of a membrane, temperature and pressure of a fuel cell.

SUMMARY OF THE INVENTION

Accordingly, in order to overcome the above-mentioned problems occurring in the conventional humidification apparatus, the present invention provides a humidifier for humidifying reactant gases for a polymer electrolyte fuel cell system which is capable of adjusting the amount of water for humidification while reducing the electrical power consumption and size, thereby maintaining an optimal temperature and humidity of the reactant gases supplied to a polymer electrolyte fuel cell.

BRIEF DESCRIPTION OF THE DRAWINGS

The above object and feature of the present invention will become apparent from the following description of the invention, when taken in conjunction with the accompanying drawings, in which.

DETAILED DESCRIPTION OF THE PREFERRED EMBODIMENTS

In order to accomplish the above objective, a gas supply apparatus for a fuel cell comprises: an inlet pipe through which the reactant gases are supplied from a reactant gases reservoir; a reactant gas flux regulator for adjusting the flow rate of supplied reactant gases; a humidifier for humidifying the reactant gases; a reactant gas supply pipe for supplying the humidified reactant gases to the fuel cell; a pressure regulator for adjusting the pressure of reactant gases inside the fuel cell; a coolant regulator for cooling the fuel cell; and a fuel cell temperature monitor for obtaining the temperature of the fuel cell, wherein the humidifier comprises:

a humidification vessel to which is respectively connected a reactant gas inlet pipe for supplying reactant gases thereto, a water inlet pipe for supplying water thereto, and a reactant gas supplying pipe for supplying the humidified reactant gases to the fuel cell; and a spray which is installed in the humidification vessel and which finely sprays the reactant gases and water which are supplied to the humidification vessel.

Hereinafter, the humidifier for humidifying reactant gases is described in detail with reference to the accompanying FIG. 3.

Figure 1:
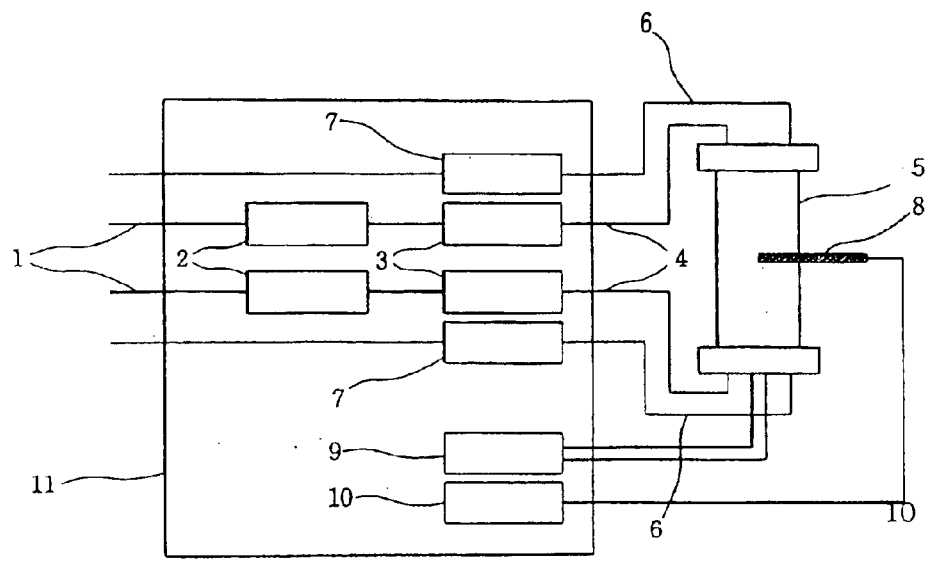
FIG. 1 is a schematic view showing a gas supply apparatus and a fuel cell for a general fuel cell system.
Figure 2:
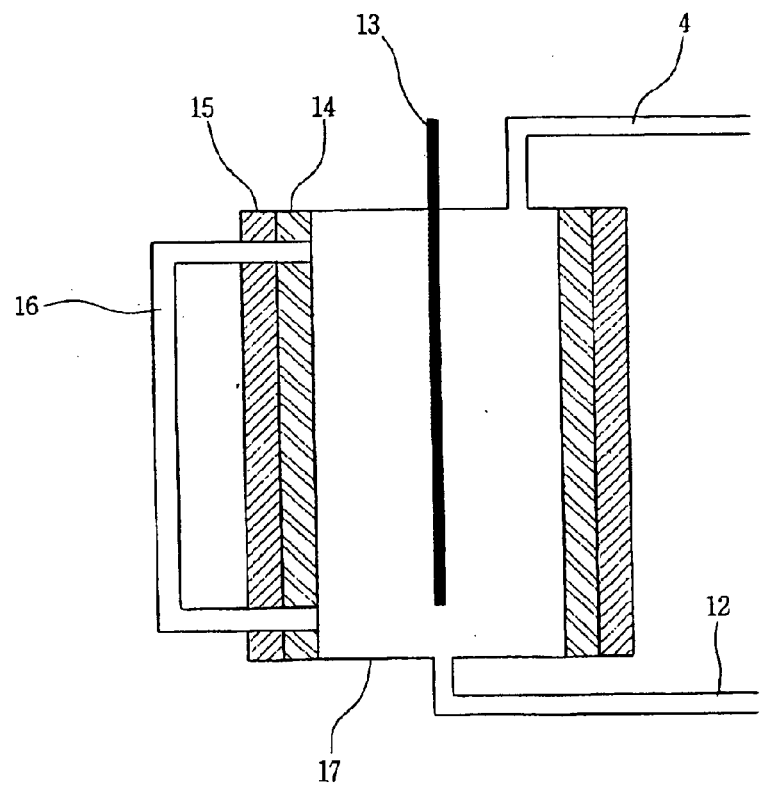
FIG. 2 is a sectional view of the conventional humidifier for a fuel cell system.
Figure 3:
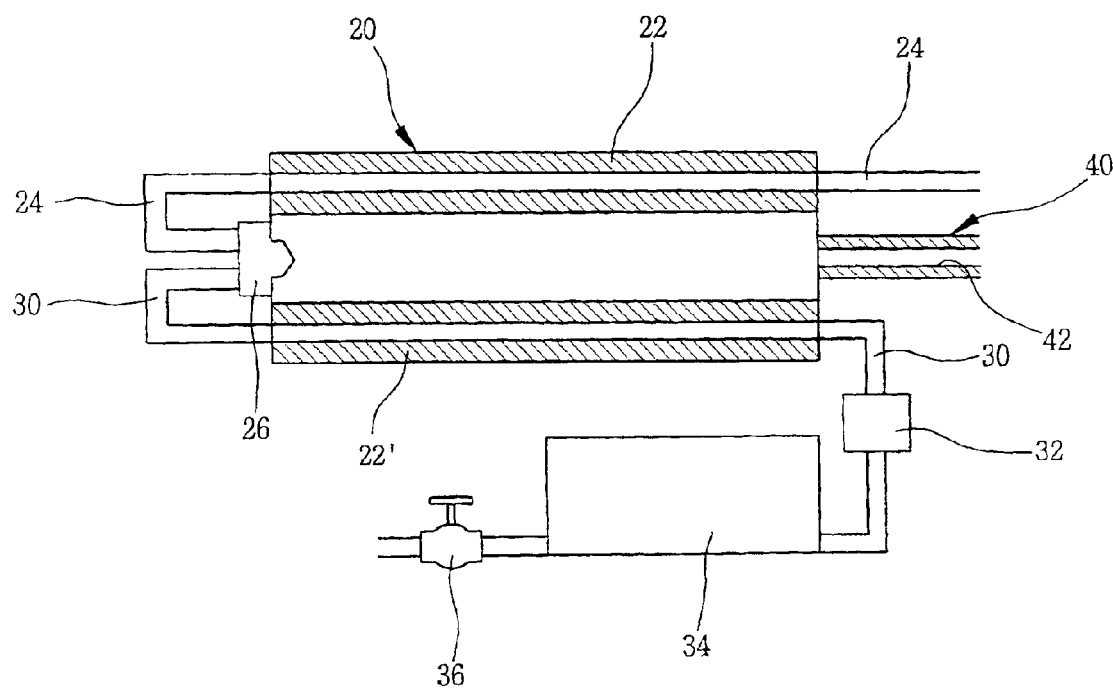
FIG. 3 is a sectional view of the humidifier for a fuel cell system in accordance with the present invention.

FIG. 3 is a sectional view of the humidifier for humidifying reactant gases for a polymer electrolyte fuel cell system in accordance with the present invention. As illustrated in FIG. 3, the humidifier for humidifying reactant gases in accordance with the present invention comprises: a humidification vessel 20 connected with a reactant gas inlet pipe 24 for supplying reactant gases and a water inlet pipe 30 for supplying water; a sprayer 26 for finely spaying water in the humidification vessel 20; a reactant gas supply pipe 24 for supplying the humidified reactant gases to the fuel cell 5; a water storage tank 34 for storing the water used in the humidification; a valve 36 for replenishing the water storage tank with water; a water flux regulator 32 for adjusting the amount of water supplied to the humidification vessel 20 for humidification.

Herein, before the reactant gases and water, which are adjusted by the reactant gas flux regulator and the water flux regulator, are supplied to the sprayer 26, they are preheated at the same temperature of the fuel cell during their passage along the double passages 22, 22' where the hot coolant flows.

Then, the spray 26 sprays the reactant gases and water so that the humidification of reactant gases is completed.

A decrease in temperature during the above spraying process is counterbalanced with heat transfer from the double passages 22, 22' where the hot coolant flows. In order to preventing condensation of the moisture in the humidified reactant gases and a decrease in the temperature of the reactant gases, the distance between the humidifier and the fuel cell is designed to be minimized, and simultaneously, the dual pipe 40 is introduced. By allowing the above coolant to flow through the interior passage 42 of the dual pipe 40, the condensation and cooling of the humidified reactant gases can be effectively prevented.

On the other hand, the water flux regulator is capable of adjusting 25 the amount of water needed for the humidification depending upon the flow rate and temperature of the reactant gases supplied to the spray, thus saving water for humidification. The valve, which is installed at the water storage tank for replenishing the tank with water, is separated from the reactant gases so that it is capable of continuing to replenish the tank without ceasing operation of the fuel cell.

As described above, consequently, by adopting spraying the reactant gases and water and heating them using the coolant heated by the fuel cell, the humidifier of the present invention does not require additional energy, which is to heat water, in contrast to the conventional humidifier and also diminishes the size of humidifier regardless of the capacity of the fuel cell. In addition, the spraying by the present invention adjusts the amount of reactant gases and water needed for humidification, thus saving water for humidification. The reactant gas supplying pipe of the present invention improves the performance of given fuel cell.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a gas supply apparatus for a polymer electrolyte fuel cell system comprising an inlet pipe through which reactant gases are supplied from a reactant gas reservoir, a reactant gas flux regulator for adjusting a flow rate of supplied reactant gases, a reactant gas supply pipe for supplying humidified reactant gases to a fuel cell, a pressure regulator for adjusting pressure of reactant gases inside the fuel cell, a coolant regulator for cooling the fuel cell, a fuel cell temperature regulator for adjusting temperature of the fuel cell, and a humidifier for humidifying the reactant gases for a polymer electrolyte fuel cell system, said humidifier comprising:

a humidification vessel to which are connected a reactant gas inlet pipe for supplying reactant gas thereto, a water inlet pipe for supplying water thereto, and a reactant gas supply pipe for supplying the humidified reactant gases to the fuel cell; and a sprayer, within the humidification vessel, for spraying the reactant gases and water supplied to the humidification vessel within the vessel.

2. The humidifier according to claim 1, wherein the humidification vessel is provided with a double passage, where a coolant heated by the fuel cell flows in one passage, in order to preheat the reactant gases, flowing in another passage, introduced into the reactant gas inlet pipe.

3. The humidifier according to claim 1, wherein the humidification vessel is provided with a double passage, where hot coolant heated by the fuel cell flows in one passage, in order to preheat the water, flowing in another passage, introduced into the water inlet pipe.

4. The humidifier according to claim 1, wherein the humidification vessel includes a double passage, where hot coolant heated by the fuel cell flows in one passage, which heats the humidified reactant gases, flowing in another passage, after spraying thereof by the sprayer.

5. The humidifier according to claim 1, wherein the reactant gas supply pipe is a dual passage allowing the coolant heated by the fuel cell to flow through an exterior passage thereof to maintain temperature and pressure of the humidified reactant gases, flowing in another passage, to be uniform.

* * * * *